(12) United States Patent
Wang et al.

(10) Patent No.: US 11,506,858 B2
(45) Date of Patent: Nov. 22, 2022

(54) LENS MODULE

(71) Applicant: Rays Optics Inc., Hsinchu County (TW)

(72) Inventors: Shin-Jen Wang, Hsinchu County (TW); Shih-Ching Huang, Hsinchu County (TW)

(73) Assignee: Rays Optics Inc., Hsinchu County (TW)

( * ) Notice: Subject to any disclaimer, the term of this patent is extended or adjusted under 35 U.S.C. 154(b) by 474 days.

(21) Appl. No.: 16/735,702

(22) Filed: Jan. 7, 2020

(65) Prior Publication Data
US 2021/0208365 A1    Jul. 8, 2021

(51) Int. Cl.
| G02B 7/02 | (2021.01) |
| H04N 5/225 | (2006.01) |
| G02B 9/12 | (2006.01) |
| G03B 17/12 | (2021.01) |

(52) U.S. Cl.
CPC .......... *G02B 7/021* (2013.01); *H04N 5/2254* (2013.01); *G02B 9/12* (2013.01); *G03B 17/12* (2013.01)

(58) Field of Classification Search
CPC ......... A46B 13/02; A46B 5/02; A61C 17/225; B25G 1/10; B29C 2045/1682; B29C 45/1676; B29L 2031/425; B32B 1/08; B32B 2250/24; B32B 2597/00; B32B 27/08; B32B 3/28; Y10T 16/444; Y10T 16/466; Y10S 16/18; Y10S 16/19; G02B 7/021; G02B 9/12; G03B 17/12; G03B 2217/002; G03B 30/00
See application file for complete search history.

(56) References Cited

U.S. PATENT DOCUMENTS

| 1,325,936 | A | * | 12/1919 | Fouasse | A61B 1/00188 219/121.6 |
| 10,197,882 | B2 | * | 2/2019 | Bertolini | B32B 17/10761 |
| 2004/0165877 | A1 | * | 8/2004 | Hsiao | G02B 7/08 396/85 |

FOREIGN PATENT DOCUMENTS

| TW | I300144 | 8/2008 |
| TW | M479439 | 6/2014 |

\* cited by examiner

*Primary Examiner* — Joseph P Martinez
*Assistant Examiner* — Vipin Patel
(74) *Attorney, Agent, or Firm* — JCIPRNET

(57) ABSTRACT

A lens module including a lens barrel and a plurality of lenses having refractive power is provided. The lenses are arranged in the lens barrel from an object side to an image side. The lens barrel has an inner-wall surface and an outer-wall surface opposite to each other, and has an air outlet communicating with outside. The air outlet is located between the inner-wall surface and the outer-wall surface. A first lens of these lenses is a lens closest to the object side. The first lens has an object-side optical surface facing the object side. At least over 95% of the surface area of the object-side optical surface of the first lens is exposed to outside, and a material of the first lens is glass. Furthermore, another lens module is also provided.

20 Claims, 6 Drawing Sheets

LENS MODULE

BACKGROUND OF THE DISCLOSURE

Technical Field

The present disclosure relates to an optical module, and more particularly to a lens module.

Background

In the existing process of assembling lenses, each lens is sequentially assembled in the lens barrel along the optical axis. When the outermost lens is to be assembled, the outermost lens isolates the inside of the lens barrel from the outside and creates an air-tight space inside the lens barrel. Besides, the internal air provides the lens with an outward pressure to move the position of lens outward, which causes that the lens appears to be floating and is difficult to be assembled to the predetermined position. Even if the lens is forced to be assembled completely, in an environment with a large temperature difference, the air inside the lens barrel that is not discharged will cause different degrees of pressure on the lens along with the change of temperature, and the pressure will cause the position of lens to deviate to different degrees and thus the lens is deviated from the originally set position. The above phenomenon has caused the current lens to have poor reliability and optical quality.

In order to solve the above problem, one approach is: by setting a retainer at the opening of the lens barrel, when the outermost lens is pushed due to an outward pressure generated by the air inside the lens, the retainer can provide an inward resistance. However, the setting of the retainer will cause the lens to be too large, which does not meet the trend of miniaturization of the product.

SUMMARY

The present disclosure provides a lens module, which is easy to assemble, and has good reliability and optical quality.

An embodiment of the present disclosure provides a lens module, which includes a lens barrel and a plurality of lenses with refractive power. These lenses are arranged in the lens barrel from the object side to the image side. The lens barrel has an inner-wall surface and an outer-wall surface opposite to each other and is provided with an air outlet communicating with the outside, wherein the air outlet is located between the inner-wall surface and the outer-wall surface. The first lens among these lenses is the lens closest to the object side. The first lens has an optical surface facing the object side. At least over 95% of the surface area of the optical surface of the first lens is exposed to the outside, and the material of the first lens is glass.

An embodiment of the present disclosure provides a lens module, which includes a lens barrel and a plurality of lenses with refractive power. These lenses are arranged in the lens barrel from the object side to the image side. The lens barrel has an inner-wall surface and an outer-wall surface opposite to each other and is provided with an air outlet communicating with the outside, wherein the air outlet is located between the inner-wall surface and the outer-wall surface. The first lens among these lenses is the lens closest to the object side. The first lens has an optical surface facing the object side. The material of the first lens is glass. There is no retainer to cover the object-side optical surface of the first lens.

Based on the above, in the lens module of the embodiment of the present disclosure, since there is an air outlet communicating with the outside provided between the inner-wall surface and the outer-wall surface of the lens barrel, during the lens assembling process, air can be discharged through the air outlet to achieve air discharging effect. Therefore, the position of lens is not easily shifted due to inner air pressure and the lens can be assembled to the predetermined position. The lens can be assembled easily and thus the lens module has good reliability and optical quality.

DETAILED DESCRIPTION OF DISCLOSED EMBODIMENTS

Figure 1:
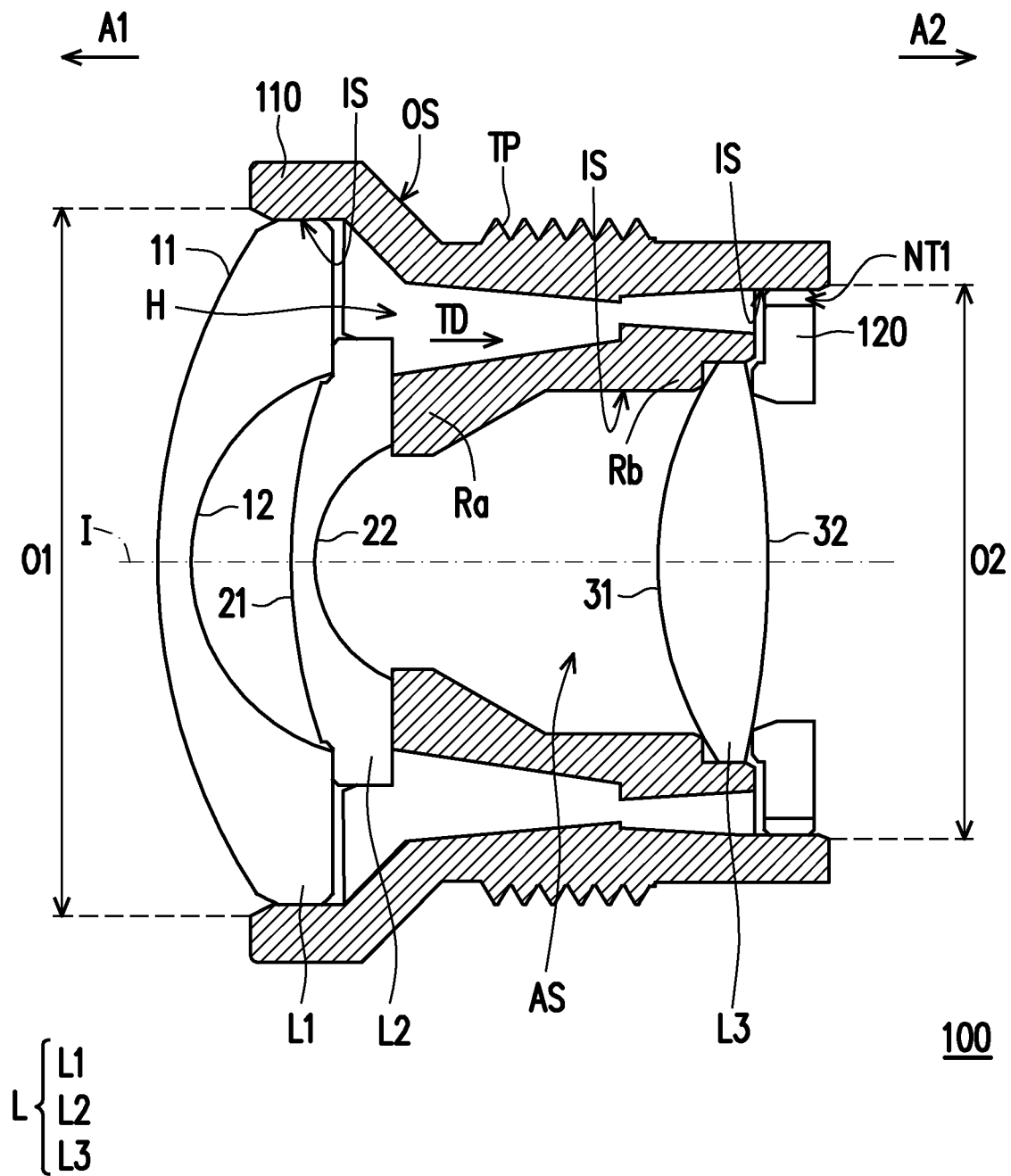
FIG. 1 is a schematic cross-sectional view of a lens module according to an embodiment of the present disclosure.
Figure 2A:
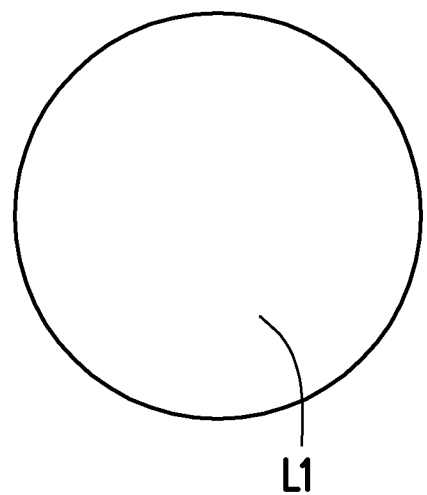
FIG. 2A is a schematic front view of the lens L1 of the embodiment in FIG. 1.
Figure 2B:
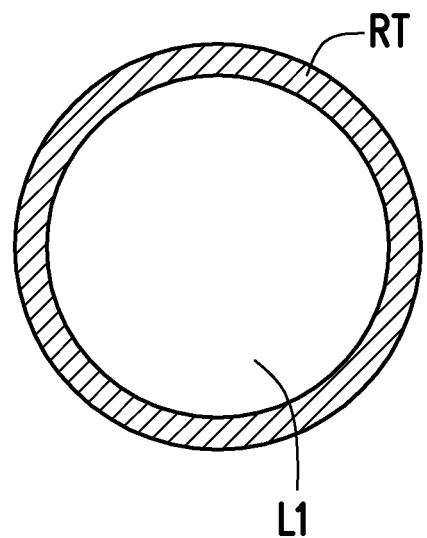
FIG. 2B is a schematic front view of the lens L1 provided with a retainer.

FIG. 1 is a schematic cross-sectional view of a lens module according to an embodiment of the present disclosure. FIG. 2A is a schematic front view of the lens L1 of the embodiment in FIG. 1. FIG. 2B is a schematic front view of the lens L1 provided with a retainer.

Please refer to FIG. 1. In this example, the application field of the lens module 100 may be an imaging system for vehicles, security, and portable electronic products and the like. The present disclosure provides no limitation to the application field. The lens module 100 has an optical axis I, and includes a lens barrel 110, a plurality of lenses L, and a spacer 120. The above components will be explained in detail in the following paragraphs.

The lens barrel 110 refers to a component for installing the lens L, and has the function of protecting the lens L and the inner optical path of the lens module 100. The lens barrel 110 is provided with a bearing Ra and a bearing Rb. The bearing in this example refers to the component or structure configured to restrict the lens L provided in the lens barrel 110 from moving to left or right, such as protrusions, recesses or mechanisms of various shapes. The lens barrel 110 has an inner-wall surface IS and an outer-wall surface OS which are opposite to each other. The inner-wall surface IS defines the accommodation space AS. The outer-wall surface OS faces the outside, and the outer-wall surface OS has a threaded portion TP, and the lens barrel 110 is adapted to be combined with the lens holder (not shown in this example) through the threaded portion TP. In addition, the lens barrel 110 has an object-side opening O1 facing the object side A1 and an image-side opening O2 facing the image side A2 for the imaging light to enter and leave the lens barrel 110, respectively. When another embodiment is applied to a projection lens, the object-side opening O1 of the lens barrel 110 is the side from which the projection light leaves, and the image-side opening O2 is the side facing the light valve.

It is worth mentioning that, in this example, the lens barrel 110 is provided with an air outlet H communicating with the outside. In detail, the air outlet H is located between the inner-wall surface IS and the outer-wall surface OS. The penetration direction TD of the air outlet H is substantially parallel to the optical axis direction of the optical axis I.

The lens L is also referred to as lens element. The lens L refers to an optical component that at least one of its exit and incident surfaces is non-planar, or an optical component that at least one of its exit and incident surfaces of the lens L has refractive ability (or referred to as refractive power). In this example, the number of lenses L is, for example, three, and they are respectively labeled as L1-L3, and the material of lenses L1-L3 are all glass. In other embodiments, the number of lenses L may be five, six, seven, or even eight or more, or less than three, which is only an example, and the present disclosure provides no limitation to the number of lens L.

In this example, the material of the lens L1 to L3 are all glass, it is worth mentioning that when the lens L1 is glass, it can achieve waterproof and scratch resistance effects. In other embodiments, in order to meet the trend of light weight, the material of the lenses L2 and L3 can also be changed to plastic, which is not limited in the present disclosure. Each of lenses L1 to L3 has an object-side optical surface 11, 21 and 31 facing the object side A1 and an image-side optical surface 12, 22 and 32 facing the image side A2.

The main function of the spacer 120 is to provide the lens L with supporting force. The spacer 120 may be a support component, a support ring or a section, and the material thereof is, for example, plastic and can be manufactured by an injection molding process. In the injection molding process, the spacer 120 may form a cut edge or a notch NT1, but the disclosure provides no limitation to the manufacturing method.

In the following paragraphs, the configuration relationship between the above components will be explained in detail.

Please refer to FIG. 1. In this example, these lenses L1 to L3 are sequentially arranged in the lens barrel 110 from the object side A1 to the image side A2 along the optical axis I. The lens L1 (referred to as the first lens) is the first lens counted from the object side A1 to the image side A2, and the lenses L2 and L3 are the second and third lenses respectively, and so on. The spacer 120 is disposed in the lens barrel 110 and is in contact with the lens barrel 110. The lens L1 is bonded to the lens barrel 110 by, for example, dispensing. The lens L2 leans on the bearing Ra. The lens L3 leans on the bearing Rb and the spacer 120, respectively. The air outlet H of the lens barrel 110 and the cut edge or notch NT1 of the spacer 120 together provide a channel for the air in the accommodation space AS to go outward.

Please refer to FIG. 1 and FIG. 2A. It is worth mentioning that in this example, since the object-side opening O1 of the lens barrel 110 is not provided with a retainer, that is, the object-side optical surface 11 of the lens L1 is exposed to the outside without being pressed (covered) by the retainer. Specifically, in this example, at least over 95% of the surface area of the object-side optical surface 11 of the lens L1 is exposed to the outside. In another embodiment, at least over 98% of the surface area of the object-side optical surface 11 of the lens L1 is exposed to the outside. Please refer to FIG. 2B. Compared with the conventional lens module provided with the retainer RT, the object-side optical surface 11 of the lens L1 is partially covered by the retainer RT. Moreover, the conventional lens module is larger due to the configuration of the retainer RT, and therefore, the size of the lens module 100 in this example is smaller than that of the conventional lens module, which can meet the trend of miniaturization of product.

In addition, in this embodiment, the spacer 120 is, for example, disposed between the lens L3 and the image side A2, and is configured to provide a supporting force to the lens L3. The spacer 120 can be regarded as a supporting component or a supporting ring. In other embodiments, the spacer 120, for example, may be disposed between two adjacent lenses and in contact with the two lenses, and may also be regarded as a spacer, the present disclosure is not limited thereto.

In the lens module 100 of another embodiment, since the lens barrel 110 is provided with the air outlet H that communicates with the outside, during the assembling process of the glass lens L1, the air can be discharged through the air outlet H to achieve an air discharging effect. Therefore, the position of glass lens L1 is not easily shifted due to inner air pressure and the glass lens can be assembled to the predetermined position. The glass lens L1 can be assembled easily and thus the lens module 100 has good reliability and optical quality.

It should be noted here that the following embodiments adopt the content of some of the foregoing embodiments, and the description of the same technical content is omitted. For the name of same components, please refer to some of the foregoing embodiments for reference, and the same description will be not repeated herein.

Figure 3:
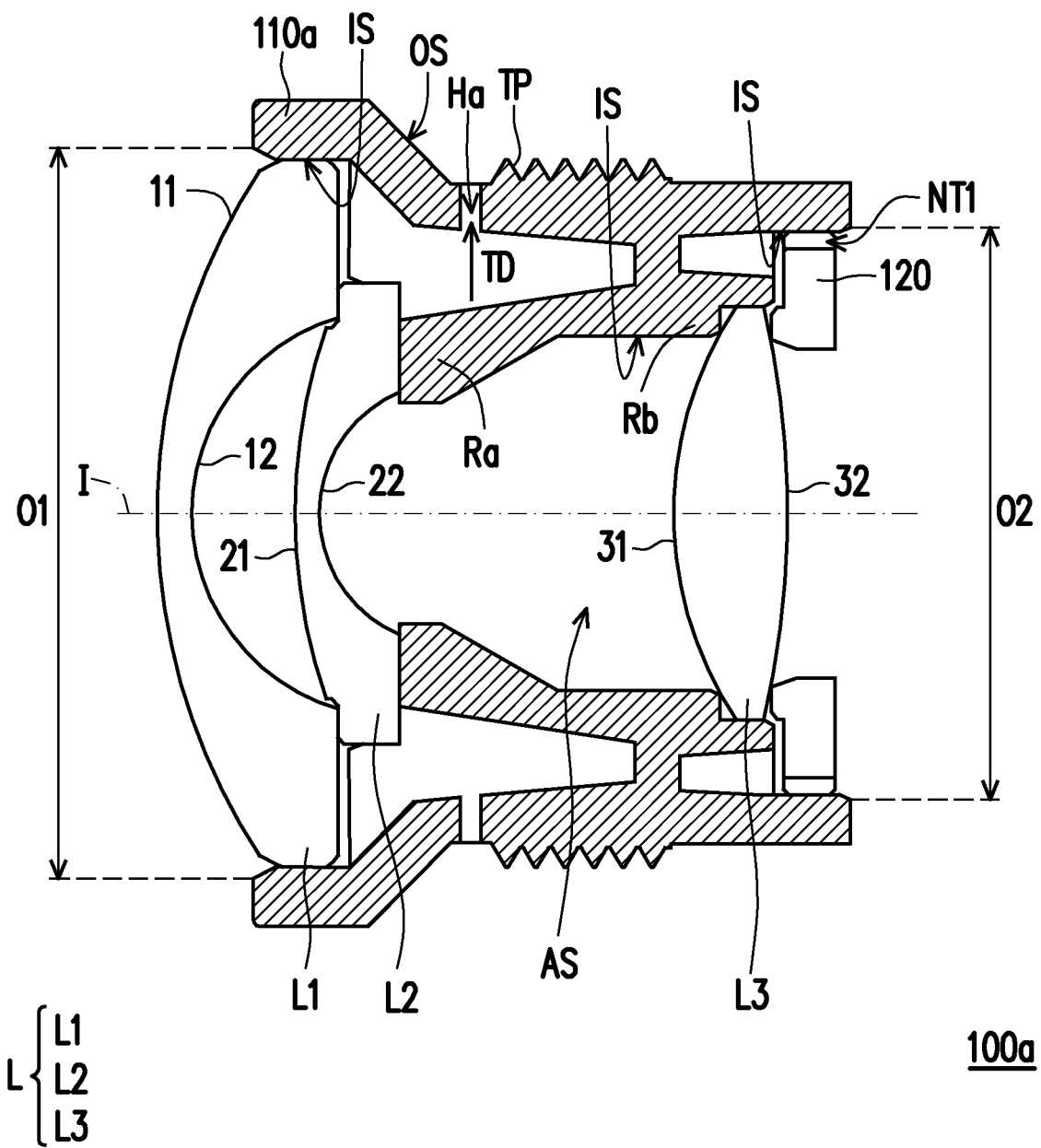
FIG. 3 is a schematic cross-sectional view of a lens module according to another embodiment of the present disclosure.
Figure 4:
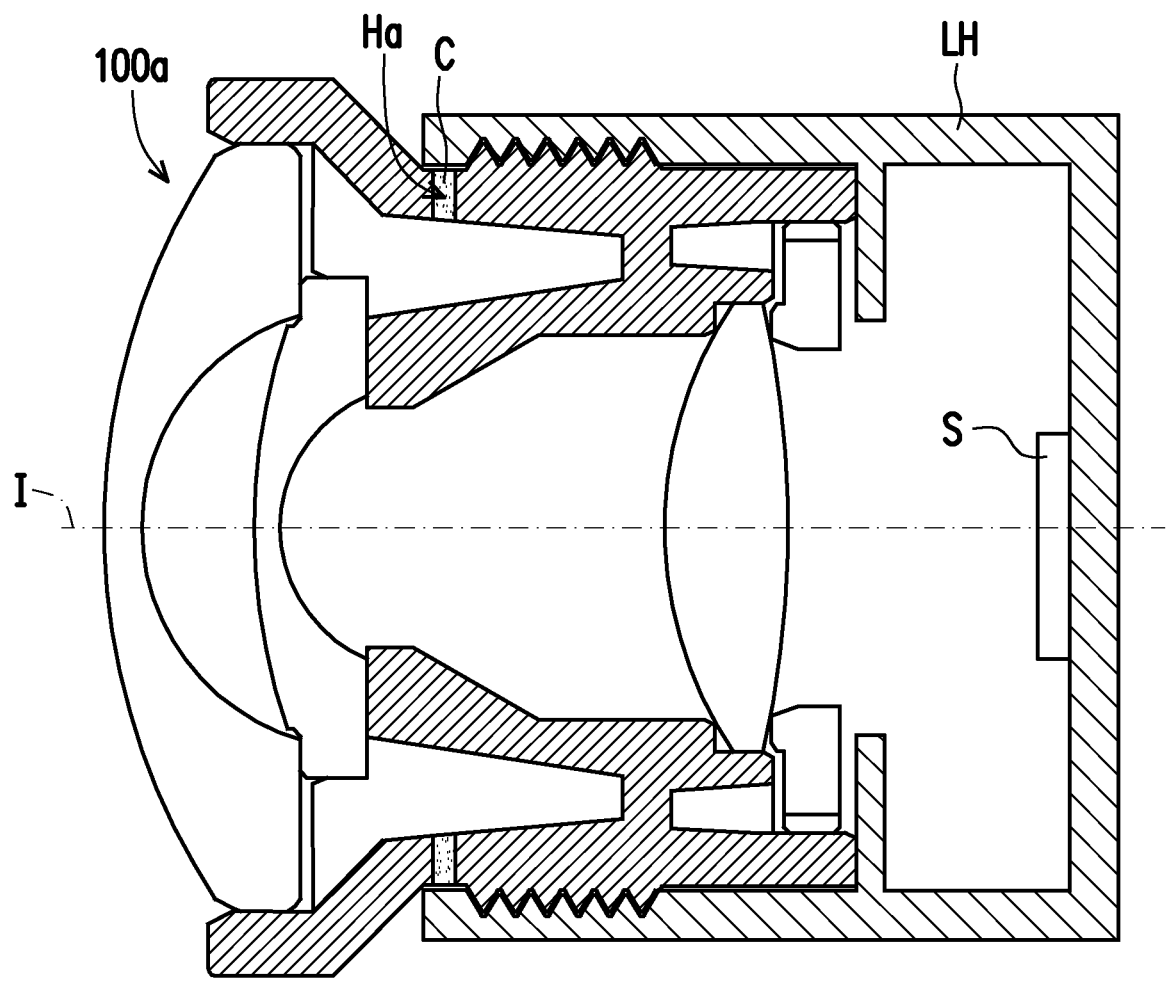
FIG. 4 is a schematic cross-sectional view of the embodiment of FIG. 3 combined with a lens holder.

FIG. 3 is a schematic cross-sectional view of a lens module according to another embodiment of the present disclosure. FIG. 4 is a schematic cross-sectional view of the embodiment of FIG. 3 combined with a lens holder.

Please refer to FIG. 3. The lens module 100a of FIG. 3 is substantially similar to the lens module 100 of FIG. 1, and the main difference between the two is that the design of the air outlet Ha of the lens barrel 110a is slightly different. In detail, the air outlet Ha is connected to the outer-wall surface OS, and the penetration direction TD of the air outlet Ha is substantially perpendicular to the optical axis direction of the optical axis I.

Please refer to FIG. 4, the lens module 100a may also be optionally screwed to the lens holder LH through the threaded portion TP of the lens barrel 110, and an image sensor S may be provided in the lens holder LH, for example. After the lens L is assembled, the colloid C can be filled into the air outlet Ha in a sealing manner to quickly seal the air outlet Ha, thereby preventing the air or moisture in the outer environment from entering the lens barrel 110. Since the lens module 100a has discharged most of the air to the outside during the assembling process, in the environment with a large temperature difference, the position of the lens L will not be shifted due to the force from inner air pressure, so the lens module 100a can have good reliability and optical quality. In another embodiment, the lens holder LH may not cover the air outlet Ha. After finishing lenses assembly, the air outlet Ha may be sealed with adhesives.

Figure 5:
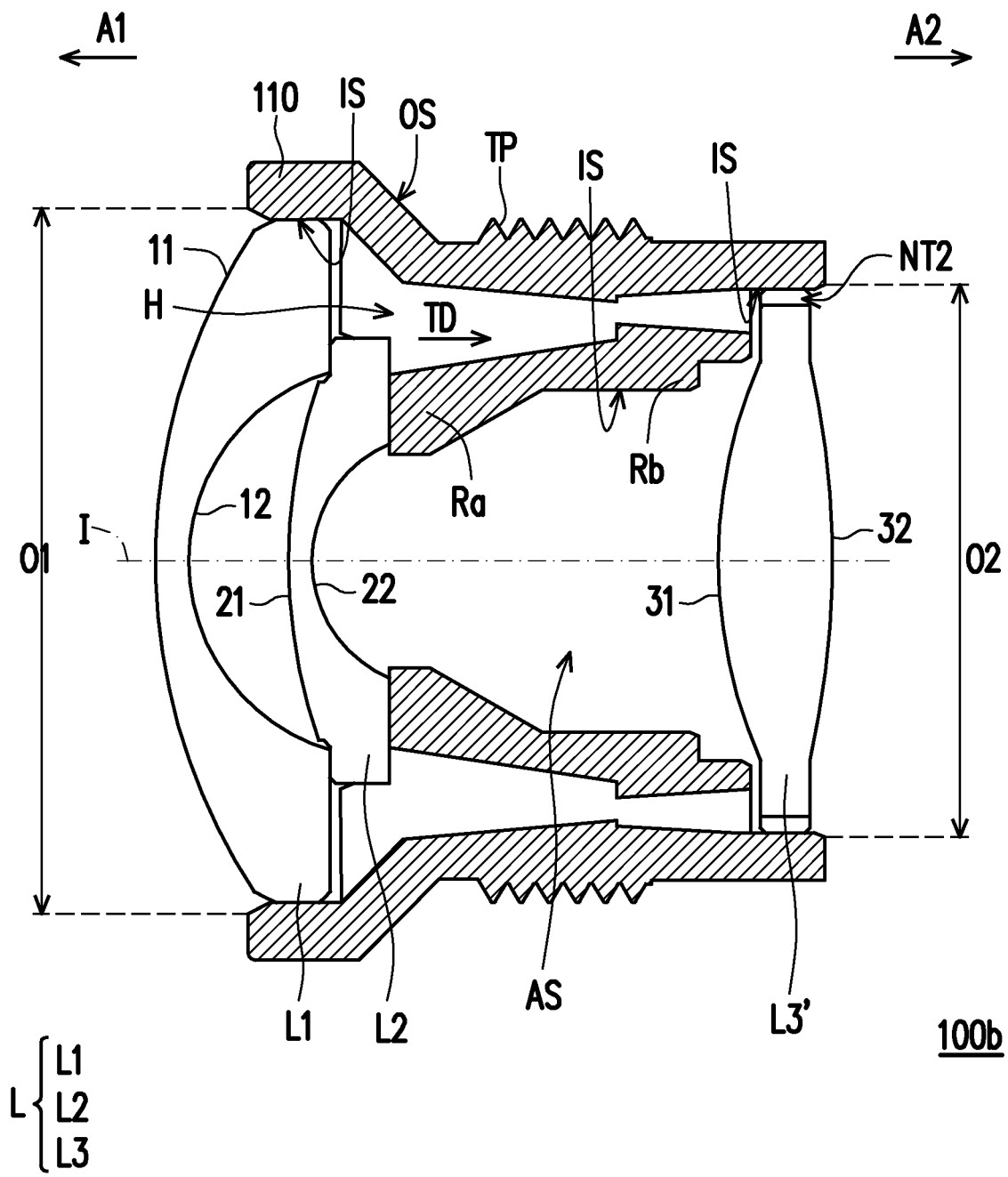
FIG. 5 is a schematic view of a lens module according to another embodiment of the present disclosure.

FIG. 5 is a schematic view of a lens module according to another embodiment of the present disclosure.

Please refer to FIG. 5. The lens module 100b of FIG. 5 is substantially similar to the lens module 100 of FIG. 1. The main difference between the two is that the plastic lens L3' (i.e., plastic lens L3' or referred to as third lens) is made of plastic. In the injection molding process, the plastic lens L3' can form a cut edge or a notch NT2, but the disclosure is not limited thereto. In addition, the lens module 100b may not be provided with the spacer 120 as shown in FIG. 1. Therefore, the air outlet H of the lens barrel 110 and the cut edge or notch NT2 of the plastic lens L3' together provide a channel for the inner air in the accommodation space AS to go outward.

Figure 6:
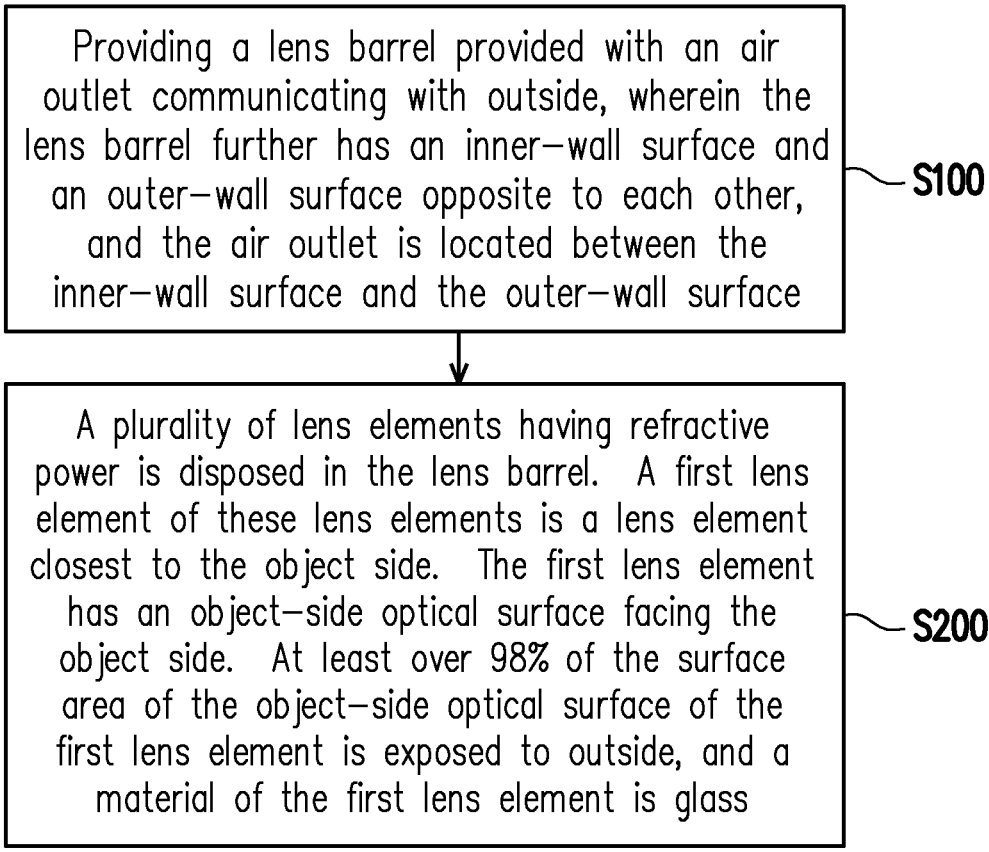
FIG. 6 is a flowchart of a manufacturing method of a lens module according to an embodiment of the present disclosure.

FIG. 6 is a flowchart of a manufacturing method of a lens module according to an embodiment of the present disclosure.

Please refer to FIG. 6 and step S100: lens barrels 110 and 110a are provided, and the lens barrels 110 and 110a are provided with air outlets H and Ha communicating with the outside, wherein the lens barrels 110 and 110a have an inner-wall surface IS and an outer wall surface OS opposite to each other, and the air outlets H and Ha are located between the inner-wall surface IS and the outer-wall surface OS.

Please refer to step S200: multiple lenses L1-L3 having refractive power are installed in the lens barrels 110 and 110a. The first lens L1 of these lenses L1 to L3 is the lens closest to the object side A1. The first lens L1 has an optical surface 11 facing the object side A1. At least over 95% of the surface area of the optical surface 11 of the first lens L1 is exposed to the outside, and the material of the first lens L1 is glass.

In summary, in the lens module of the embodiment of the present disclosure, since the inner-wall surface and the outer-wall surface of the lens barrel are provided with an air outlet communicating with the outside, during the assembling process of lens, the air can be discharged through the air outlet to achieve the discharging effect, which makes it easy to assemble lenses. The position of the lens is not easily shifted due to the inner air pressure and thus can be assembled to the predetermined position. Also, because the air in the lens barrel has been discharged during the assembling process, the air outlet can be quickly sealed through sealing after the assembly is completed, thereby preventing the air or moisture in the outer environment from entering the lens barrel. In the environment with large temperature difference, the position of lens will not be shifted due to the force from inner air pressure, so the lens module can have good reliability and optical quality.

What is claimed is:

1. A lens module comprising a lens barrel and a plurality of lenses having refractive power, wherein,
    the lens barrel has an inner-wall surface and an outer-wall surface opposite to each other and is provided with an air outlet communicating with the outside, wherein the air outlet is located between the inner-wall surface and the outer-wall surface; and
    a first lens of the lenses is the lens closest to an object side, the first lens has an object-side optical surface facing the object side, and at least over 95% of a surface area of the optical surface of the first lens is exposed to the outside, and a material of the first lens is glass, wherein the air outlet is capable of communicating with an inside space being inside the lens barrel and reaching a surface of the first lens facing away from the object side.

2. The lens module according to claim 1, wherein the inner-wall surface defines an accommodation space, and the outer-wall surface faces the outside, wherein the lenses are disposed in the accommodation space and lean on the inner-wall surface.

3. The lens module according to claim 2, wherein a penetration direction of the air outlet is substantially parallel to an optical axis direction of the lens.

4. The lens module according to claim 2, wherein a penetration direction of the air outlet is substantially perpendicular to an optical axis direction of the lens.

5. The lens module according to claim 2, wherein the outer-wall surface of the lens barrel is provided with a threaded portion.

6. The lens module according to claim 5, wherein the threaded portion is adapted to be screwed to a lens holder.

7. The lens module according to claim 1, wherein the lenses further comprise a second lens, and the second lens is the lens closest to an image side, and a material of the second lens is plastic and has a cut edge.

8. The lens module according to claim 1, wherein at least over 98% of the surface area of the optical surface of the first lens is exposed to the outside.

9. The lens module according to claim 7, wherein the lenses further comprise a third lens disposed between the first lens and the second lens.

10. The lens module according to claim 8, further comprising a spacer disposed in the lens barrel, and the spacer is configured to lean on at least one of the lenses.

11. A lens module comprising a lens barrel and a plurality of lenses having refractive power, wherein,
    the lens barrel has an inner-wall surface and an outer-wall surface opposite to each other and is provided with an air outlet communicating with the outside, wherein the air outlet is located between the inner-wall surface and the outer-wall surface; and
    a first lens of the lenses is the lens closest to an object side, the first lens has an object-side optical surface facing the object side, a material of the first lens is glass,
    wherein there is no retainer to cover the object-side optical surface of the first lens, and the air outlet is capable of communicating with an inside space being inside the lens barrel and reaching a surface of the first lens facing away from the object side.

12. The lens module according to claim 11, wherein the inner-wall surface defines an accommodation space, and the outer-wall surface faces the outside, wherein the lenses are disposed in the accommodation space and lean on the inner-wall surface.

13. The lens module according to claim 12, wherein a penetration direction of the air outlet is substantially parallel to an optical axis direction of the lens.

14. The lens module according to claim 12, wherein a penetration direction of the air outlet is substantially perpendicular to an optical axis direction of the lens.

15. The lens module according to claim 12, wherein the outer-wall surface of the lens barrel is provided with a threaded portion.

16. The lens module according to claim 15, wherein the threaded portion is adapted to be screwed to a lens holder.

17. The lens module according to claim 11, wherein the lenses further comprise a second lens, and the second lens is the lens closest to an image side, and a material of the second lens is plastic and has a cut edge.

18. The lens module according to claim 17, wherein the lenses further comprise a third lens disposed between the first lens and the second lens.

19. The lens module according to claim 18, further comprising a spacer disposed in the lens barrel, and the spacer is configured to lean on at least one of the lenses.

20. The lens module according to claim 11, wherein at least over 98% of the surface area of the optical surface of the first lens is exposed to the outside.

* * * * *